United States Patent
Price et al.

(10) Patent No.: US 7,703,733 B2
(45) Date of Patent: Apr. 27, 2010

(54) SUPPORT FOR ELECTRICAL DISPLAY DEVICE

(75) Inventors: Oliver Price, London (GB); Andrew Wills, London (GB); Alex Lau, London (GB)

(73) Assignee: Colebrook Bosson Saunders Products Ltd, London (GB)

( * ) Notice: Subject to any disclaimer, the term of this patent is extended or adjusted under 35 U.S.C. 154(b) by 1021 days.

(21) Appl. No.: 10/521,245

(22) PCT Filed: Jul. 14, 2003

(86) PCT No.: PCT/GB03/03029

§ 371 (c)(1),
(2), (4) Date: Aug. 26, 2005

(87) PCT Pub. No.: WO2004/008018

PCT Pub. Date: Jan. 22, 2004

(65) Prior Publication Data

US 2006/0175499 A1    Aug. 10, 2006

(30) Foreign Application Priority Data

Jul. 16, 2002    (GB) ................................. 0216595.9

(51) Int. Cl.
*E04G 3/00*    (2006.01)
(52) U.S. Cl. .............................. 248/288.31; 248/276.1; 248/278.1; 403/122
(58) Field of Classification Search ............ 248/288.31, 248/288.51, 917–923, 282.1, 278.1, 276.1, 248/284.1, 285.1; 403/76, 114, 122, 127
See application file for complete search history.

(56) References Cited

U.S. PATENT DOCUMENTS 3,528,533 A    9/1970  Sacchini
(Continued)

FOREIGN PATENT DOCUMENTS

EP    1 229 286 A2    8/2002
(Continued)

OTHER PUBLICATIONS

International Search Report mailed Oct. 31, 2003.

*Primary Examiner*—Amy J. Sterling
*Assistant Examiner*—Steven Marsh
(74) *Attorney, Agent, or Firm*—Lando & Anastasi, LLP (57) ABSTRACT

A support for an electrical display device such as a monitor is disclosed. The support includes a pair of support members (2,3) connected by a pivot joint (4) to enable relative movement of the support members (2,3) about an axis of rotation, the joint (4) including an outer hub (11) mounted for rotation about the axis within a clamping member (5) attached to one support member (2), an inner hub (10) mounted to the other support member (3) coaxial with the outer hub (11) and being rotatable about the axis relative to the outer hub (11) in a first direction and, a clutch member (12) between the inner and outer hub (10,11) engageable in response to rotation of the inner hub (10) in the opposite direction such that the outer hub (11) rotates together with the inner hub (10) when a compressive force exerted on the outer hub (11) by the clamping member (5) is overcome. A universal joint (7) is also disclosed.

10 Claims, 6 Drawing Sheets

U.S. PATENT DOCUMENTS

| | | | |
|---|---|---|---|
| 4,382,572 A * | 5/1983 | Thompson | 248/484 |
| 5,470,040 A | 11/1995 | Bhagat et al. | |
| 5,681,005 A | 10/1997 | Ligon, Sr. et al. | |
| 6,050,645 A | 4/2000 | Bradbury | |
| 6,758,454 B2 * | 7/2004 | Smed | 248/314 |
| 6,863,252 B2 * | 3/2005 | Bosson | 248/278.1 |
| 6,915,996 B2 * | 7/2005 | Lin | 248/288.51 |
| 7,398,950 B2 * | 7/2008 | Hung | 248/276.1 |
| 2002/0015296 A1 | 2/2002 | Howell et al. | |
| 2005/0127261 A1 * | 6/2005 | Lin | 248/288.51 |

FOREIGN PATENT DOCUMENTS

| WO | WO 94/09727 | 5/1994 |
|---|---|---|
| WO | WO 01/76515 A2 | 10/2001 |

* cited by examiner

SUPPORT FOR ELECTRICAL DISPLAY DEVICE

The present invention relates to a support for an electrical display device such as flat screen computer monitor that enables the display to be oriented in any desired position to suit the viewer.

Supports for flat screen computer monitors are known and generally comprise a pair of support arms pivotally connected together. A free end of one arm is mounted to a wall or is formed with a sleeve to enable it to be mounted to an uptight support post clamped to a desk or workstation. The free end of the other arm is usually attached to a support plate via a universal joint to enable the screen to be located in any desired position. The back surface of the display screen is attached to the support plate via a quick release mechanism to enable the screen to be detached from the arm for repair or replacement.

The pivot joint connecting the arms together must be designed so that it is sufficiently stiff to hold and maintain the monitor in a set position but free enough so that a user can manipulate the joint when a force is applied thereto. When the monitor is to be moved, it is usually grasped in both hands and pushed and/or pulled into the desired position so that a frictional force between a member on one arm pivotally connected to another member on the other arm is overcome allowing the members to rotate relative to each other. It will be appreciated that the frictional force between the members must be sufficient to ensure that the weight of the display monitor and the arm to which it is attached cannot cause the members to rotate relative to each other without the application of an outside force by the user as this would result in the monitor dropping under its own weight due to gravity. As display monitors can be relatively heavy, this presents the problem that the pivot must be relatively stiff to generate the required frictional force between the members. This results in the user having to apply a considerable force to the monitor to move it and overcome the frictional force at the pivot joint. This problem is particularly noticeable when the monitor is to be raised as the user then has to catty the weight of the monitor and arm to which it is attached as well as overcome the frictional force at the pivot joint.

Although the aforementioned problem can be addressed by providing a releasable clamp to lock and unlock the pivot joint, this is undesirable as the clamp must then be unlocked each time the monitor is moved and locked again afterwards. This means that a tool to release and tighten the joint must be provided or incorporated in the pivot joint which is not always easily accessible.

It is an object of the present invention to overcome or substantially alleviate the problems with a conventional support for a display device addressed above.

According to the present invention, there is provided a support for an electrical display device such as a monitor including a pair of support members connected by a pivot joint to enable relative movement of the support members about an axis of rotation, the joint including an outer hub mounted for rotation about the axis within a clamping member attached to one support member, an inner hub mounted to the other support member coaxial with the outer hub and being rotatable about the axis relative to the outer hub in a first direction and, a clutch member between the inner and outer hub engageable in response to rotation of the miner hub in the opposite direction such that the outer hub rotates together with the inner hub when a compressive force exerted on the outer hub by the clamping member is overcome.

It will be appreciated that the present invention provides a pivot joint in which the frictional force is only active in one direction of rotation of the arm connected to the monitor to hold it in position and prevent it from dropping under gravity due to the weight of the monitor. The force that must be overcome is generated by the clamping member against the outer hub, the outer hub rotating with the inner hub and relative to the clamping member when the inner hub is rotated in one direction only. When the arm is rotated in the other direction, the inner hub rotates relative to the outer hub and the clamping member and so the force clamping the outer hub does not need to be overcome. Therefore, when the monitor is lifted, there is no or little frictional force that must be overcome at the pivot joint and so the monitor is much easier to move to the desired position.

Preferably, the clutch member comprises a coiled element disposed around the inner hub such that the inner hub rotates relative to the coiled element in the first direction, the coiled element being drawn radially inward toward the axis of rotation in response to rotation of the inner hub in the opposite direction such that it binds and rotates with the inner hub, the coiled element being connected to the outer hub such that the outer hub rotates together with the coiled element. As the clutch is operable in response to rotation of the inner hub in a specific direction, there is no locking arrangement that must be actuated before the user can move the monitor.

In a preferred embodiment, each support member is an arm, one end of a first arm having mounting means thereon for attaching it to a wall or a support post, the remote end of said first arm being connected to one end of a second arm by the pivot joint which allows the second arm to pivot up and down in a vertical plane.

The support conveniently includes cooperating means for connecting the clamping member to the first arm, the clamping member having a beating seat to receive and locate the outer hub and the cooperating means being configured to enable the compressive force exerted on the outer hub to be adjusted.

Advantageously, the cooperating means is also configured to enable the clamping member to pivot about a second vertical axis relative to the first.

In a preferred embodiment, the coiled element is disposed in an annular space formed between the inner and outer hub.

Conveniently, the coiled element is a spring.

The support preferably includes attachment means on one end of the spring and on the outer hub for attaching the spring to the outer hub. The spring and outer hub are attached to each other so there can be no relative rotation between them.

The attachment means preferably comprises a hook portion on the spring and a notch in the outer hub, the hook portion and notch cooperating with each other to attach the spring to the outer hub. The hook portion is preferably a very tight fit in the notch.

As mentioned above, the end of one of the support arms is attached to the display screen via a universal joint to enable the screen to be located in any desired position. The universal joint may comprise a ball and socket type joint. However, a disadvantage with conventional ball and socket type joints is that the display monitor has limited movement because the socket in which the ball is received fouls the arm to which the ball is attached when a particular angle is reached thereby preventing positioning of the screen in a chosen location. Furthermore, assembly and manufacture of the universal joint is generally complex due to the number of components involved.

It is also an object of the present invention to substantially alleviate or overcome the problems addressed in the previous paragraph, independently of the problems addressed earlier, and provide a support for a display device having a universal joint that is considerably more flexible and has a much wider range of movement.

According to another aspect of the invention, there is provided a support for an electrical display device such as a monitor including a pair of support members connected by a universal joint comprising a part spherical bearing immovably mounted on one support member and received within a bearing seat pivotally mounted to the other support member to enable relative movement between the bearing and the bearing seat in any direction and, between the bearing seat and the other support member about a pivot axis.

In one preferred embodiment, the bearing seat comprises a looped element or strap that partially encircles the bearing, the ends of the looped element being pivotally mounted to the other support member. The strap advantageously has an arcuate beating surface on its inner face where it contacts the spherical bearing. The width of the strap is sufficient to retain the bearing within the arcuate bearing surface.

Conveniently, corresponding apertures are formed in the ends of the looped element and the support member to receive a fastening member to pivotally attach the looped element to the support member so that a compressive force is exerted by the looped element on the bearing. This is necessary to ensure that the bearing and looped element will only move relative to each other when a force is applied thereto by a user otherwise the monitor would drop under its own weight.

Preferably, a resilient material layer is disposed between at least one end of the looped element and the support member to enable the compressive force exerted on the bearing to be adjusted by tightening or loosening the fastening member.

In a preferred embodiment, one support member is a support arm and the other support member is a support plate to receive and mount a display device.

The bearing is preferably immovably mounted to the support plate and the bearing seat is pivotally mounted to the support arm to enable rotation of the beating seat about the pivot axis.

Advantageously, the support plate includes a mounting surface for the display device and a socket to receive and immovably mount the bearing.

The bearing and support plate may be integrally formed.

In an alternative embodiment, the being is immovably mounted to the support arm and the bearing seat is pivotally mounted to the support plate.

Preferably, the support arm comprises a pair of parallel support legs, the legs being spaced from each other by the bearing.

In one embodiment, wherein the support plate includes a mounting surface for the display device and a head portion to pivotally mount the beating seat thereto for rotation about the pivot axis.

It will be appreciated that the two different aspects of the invention may be employed independently or together in the same display support.

Embodiments of the present invention will now be described, by way of example only, with reference to the accompanying drawings, in which.

Figure 1:
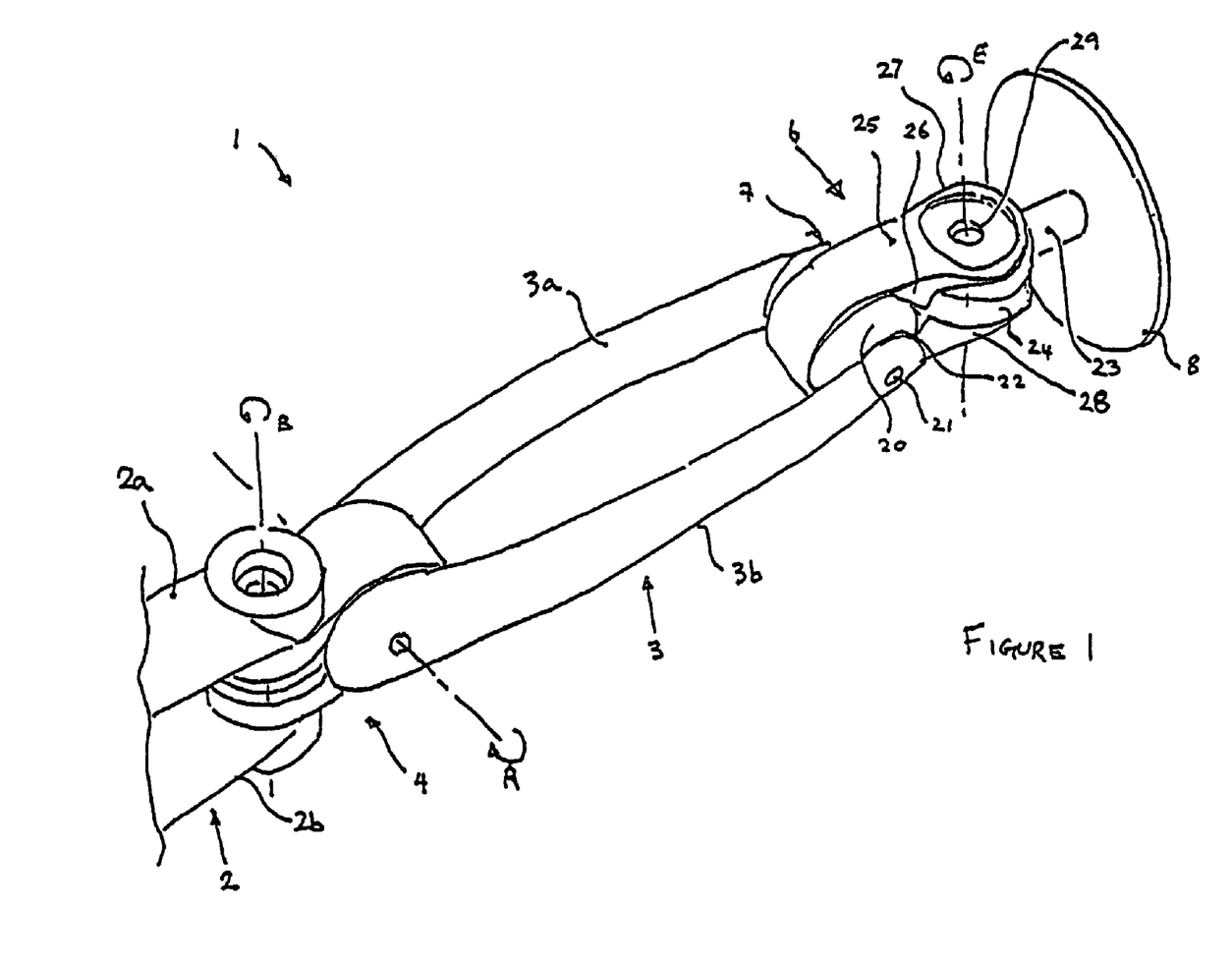
FIG. 1 shows a partial perspective view of a monitor support according to an embodiment of the invention.

Referring now to the drawings, there is shown in FIG. 1 a support 1 for an electrical display device (not shown) having first and second support arms 2,3 connected by a pivot joint 4 having a generally C-shaped camping member 5 connecting the first and second support arms 2,3 together. Each support arm comprises a pair of parallel support legs 2a,2b, 3a,3b. A universal joint 6 is mounted to the remote end 7 of the second support arm 3 and is connected to a support plate 8 to which a display monitor may be releasably attached via a quick release mechanism (not shown). The construction of the universal joint 6 will be described in more detail late. The free end of the first support arm 2 (not shown) is attached to a bracket or a sleeve to enable the support 1 to be mounted to a wall or located on an upright support post (not shown) clamped to a desk or workstation.

Figure 2:
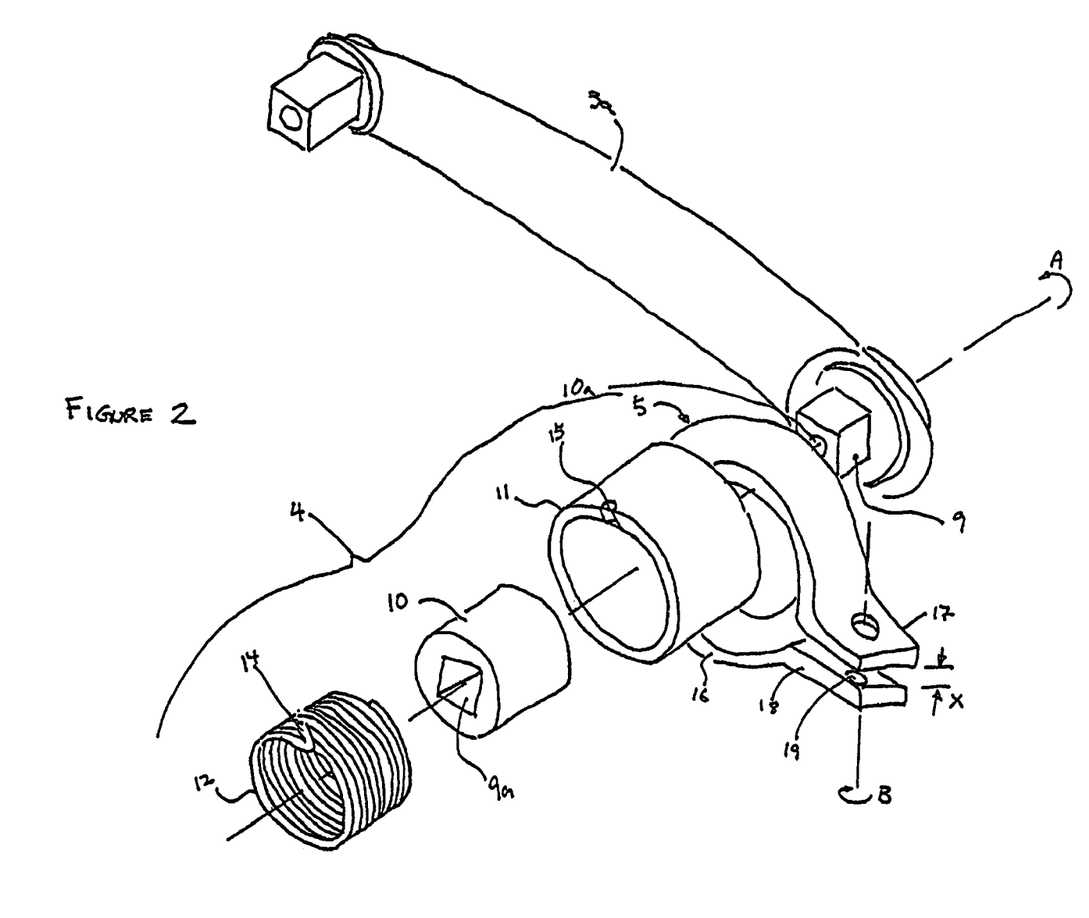
FIG. 2 shows an exploded perspective view of one of the arms and pivot joint of the monitor support illustrated in FIG. 1.

The construction of the pivot joint 4 will now be described in more detail. The support arm 3 may rotate relative to the support arm 2 about a pivot axis indicated by A in the drawings. Referring primarily to FIG. 2, a boss 9 extends from the support leg 3a to immovably receive and locate a cylindrical inner hub member 10 having its longitudinal axis coincident with the pivot axis A. The other support leg 3b also has an identical boss (not shown) which is received in an opening 9a in the opposite end of the inner hub 10. The support legs 30b and inner hub 10 are secured together with a bolt (not shown) that extends through an aperture 10a in the inner hub 10 and the legs 3a, 3b, the legs 3a being parallel to each other and spaced by the inner hub 10.

In one alternative unillustrated arrangement, the cylindrical inner hub 10 may be integrally formed with one of the support legs 3a, 3b.

The inner hub 10 is coaxially located within an outer hub 11 in the form of a cylindrical ring having its longitudinal axis coincident with the pivot axis A. It will be apparent that the outer hub 11 has a larger diameter than the inner hub 10 so that the inner hub 10 will fit within the outer hub 11.

A clutch member in the form of a coiled spring 12 is disposed around the inner hub 10 in an annular space 13 (see FIG. 3) formed between the inner and outer hubs 10,11. The inner diameter of the coiled spring 12 is only just greater than the diameter of the inner hub 10 to allow the inner hub 10 to rotate in one direction whilst the spring 12 remains stationary. One end of the spring has a bent back or hooked portion 14 and the outer hub 11 has a corresponding notch or cut out 15 to receive the hooked portion 14 when the spring 12 is received between the inner and outer hubs 10,11, thereby connecting the spring 12 and outer hub together so that they cannot rotate relative to each other in either direction.

The clamping member is generally C-shaped although the two ends almost meet to form a complete ring but are spaced by a distance X for reasons that will become apparent. A radially extending flange 17,18 having an aperture 19 therethrough is formed at each end of the clamping member 5.

Figure 3:
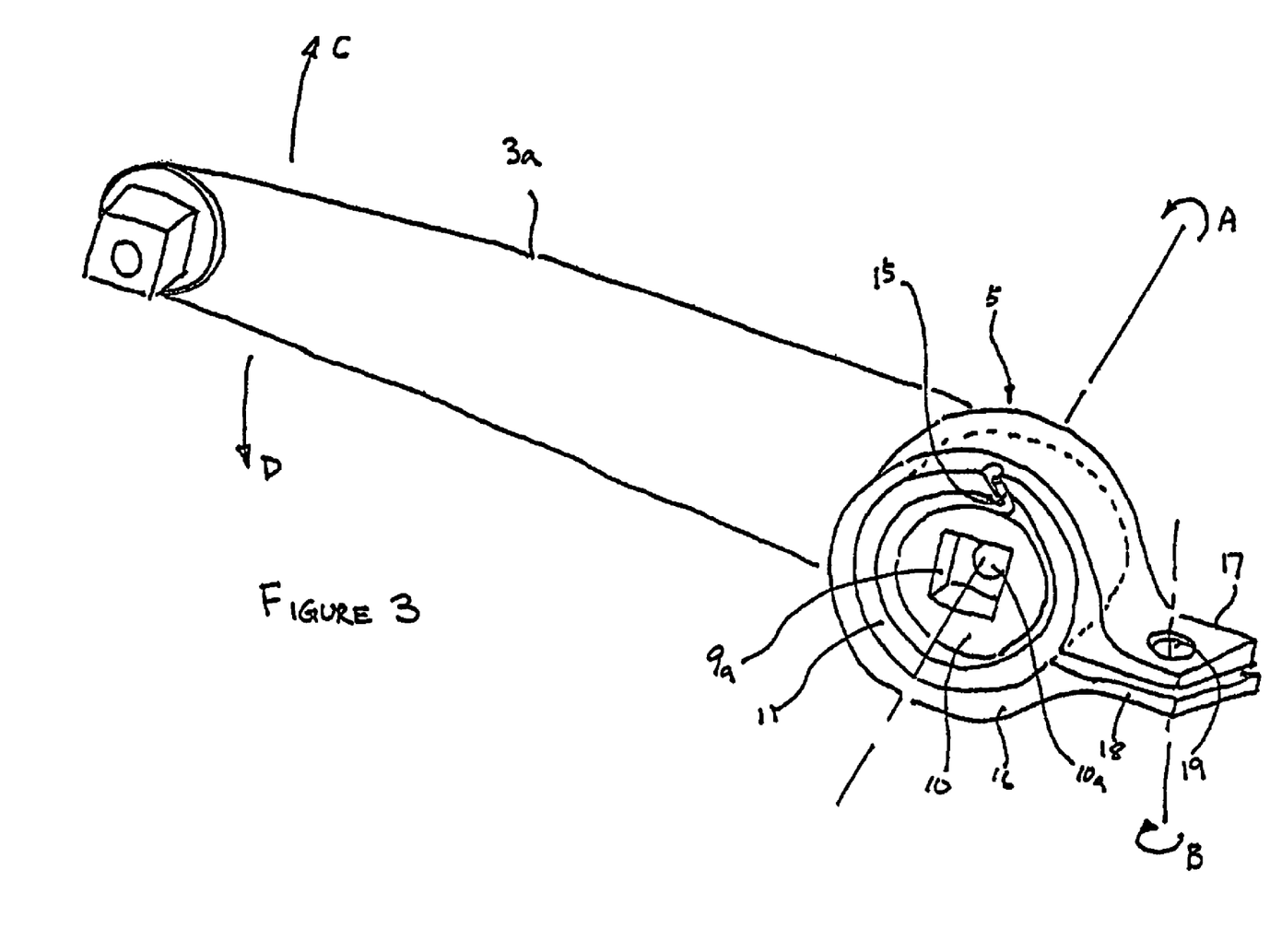
FIG. 3 shows a partially assembled view of the arm and pivot joint shown in FIG. 2.

The outer hub 11 is received within the clamping member 5 as shown in FIG. 3. The clamping member 5 is then attached between support legs 2a, 2b, as shown in FIG. 1, using a bolt that extends through the support legs 2a, 2b the apertures 19 in the flanges 17,18. The bolt is tightened so that the distance X between the flanges 17,18 is reduced and the clamping member tightens around the outer hub 11 so that the outer hub can only rotate within the clamping member 5 when the compressive force applied to the outer hub 11 by the clamping member 5 is overcome. It will be appreciated that the clamping member may also pivot about an axis indicated by B in FIG. 1, at right angles to the first axis indicated by A and extending through the bolt mounting the clamping member 5 to the support arm 2.

Operation of the pivot joint will now be explained. When the arm 3 is rotated about the axis A in an upward direction indicated by arrow C in FIG. 3, the inner hub 10 rotates relative to the spring 12 and the outer hub 11 to which the spring 12 is connected remains stationary. Therefore, the user does not have to overcome the friction between the outer hub 11 and the clamping member 5 to rotate the arm 3 relative to the other arm 2 about the pivot axis A. However, when the arm 3 is rotated in the opposite downward direction indicated by arrow D in FIG. 3, the coils of the spring 12 tighten and are drawn radially inwardly and so bind against the surface 10b of the inner hub 10. Further rotation of the arm 3 causes the inner hub 10 and the spring 12 to rotate together. As the spring is connected to the outer hub 11 via the hooked portion 14 and notch 15, the outer hub 11 also rotates. However, as the outer hub 11 is in frictional engagement with the clamping member 5, the force preventing the outer hub 11 from rotating must be overcome before the inner hub 10 and therefore the arm 3 will rotate. It is this force that prevents the arm and the monitor to which it is attached from pivoting under gravity due to their weight.

The universal joint 7 will now be described in more detail. As shown in FIG. 1, a substantially spherical bearing 20 is mounted between the legs 3a, 3b at the end of the arm 3 opposite to the pivot joint 4. The spherical beating 20 is immovably held between the legs 3a, 3b by a bolt (not shown) that extends through an aperture 21 in the legs 3a, 3b and through the spherical bearing 20. The spherical beating 20 may have flattened regions 22 where it meets the legs 3a, 3b.

A shaft 23 upstands from the rear of the support plate 8 and has a disc shaped head 24 attached thereto. A C-shaped connecting strap or loop 25 passes around the spherical bearing and is attached to the disc shaped head 24. The strap 25 has an arcuate beating surface 26 that contacts the spherical bearing 20 and is wide enough to retain the spherical bearing within the bearing surface 26. The ends 27, 28 of the strap 25 are connected to either side of the disc shaped head by means of a bolt (not shown) that extends through an aperture 29 in the ends 27, 28 of the strap 25 and through an aperture in the disc shaped head 24 so that the head 24 can rotate with respect to the strap 25 about an axis E extending through the bolt. It will also be appreciated that the strap 24 together with the head 24 and support plate 8 can move relative to the support arm 3 in any direction about the spherical bearing 20.

Figure 4:
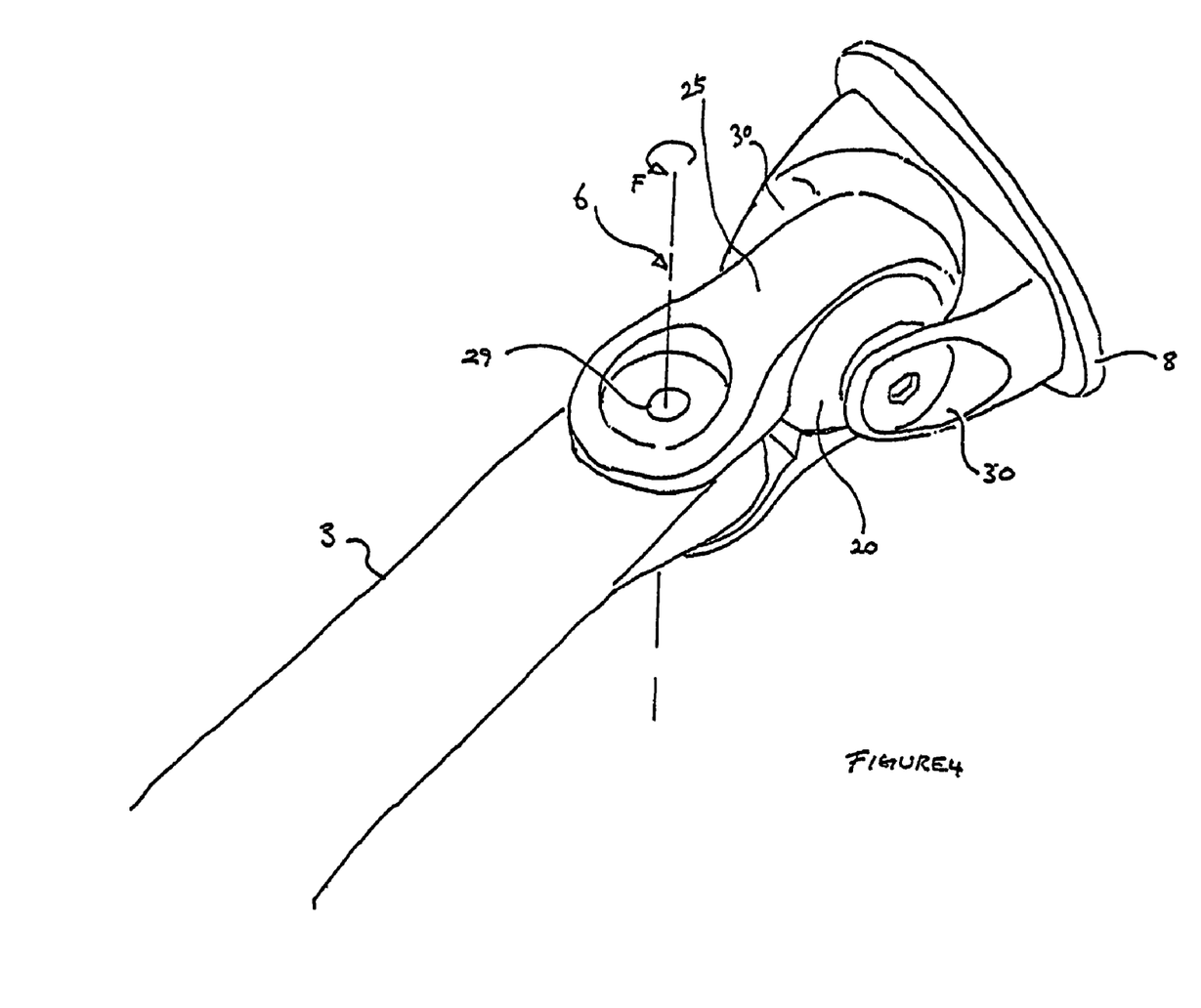
FIG. 4 shows an enlarged perspective view of an alternative universal joint arrangement to that shown in the support of FIG. 1.

An alternative arrangement for the universal joint 7 is illustrated in FIG. 4. In this embodiment, the spherical bearing 20 is immovably mounted between arms 30 mounted to the back of the support plate 8. The strap 25 then loops around the spherical bearing 20 and is attached to either side of a support arm 3 using a bolt (not shown) that extends through the apertures 29 in the ends of the strap 25 and through an aperture in the end of the arm 3. The strap 25 may then pivot about the arm 3 about an axis F and the support plate 3 and spherical bearing 20 may move relative to the strap 24 in any direction.

It will be appreciated that, in both of the aforementioned embodiments, the strap is located relatively tightly around the spherical bearing 20 so that relative movement between the strap 24 and the bearing 20 will only occur when a user applies a force to the joint. The compressive force applied to the spherical bearing 20 by the strap 24 may be controlled by adjusting the tightness of the bolt connecting the strap to the head, in the first embodiment, and tightness of the bolt connecting the strap to the arm 3 in the alternative embodiment.

To provide additional control of the degree of movement, a resiliently compressible washer (not shown) may be located between the ends of the strap 24 and the component to which it is attached so that the washer will compress as the bolt is tightened and enable the pressure applied to the spherical bearing to be adjusted easily.

In the embodiment of FIG. 4, the support arm 3 is formed from a single member rather than a pair of parallel support legs. However, it will be appreciated that the embodiment could be adapted for use with an arm being formed from two legs such as that shown in FIG. 1.

Figure 5:
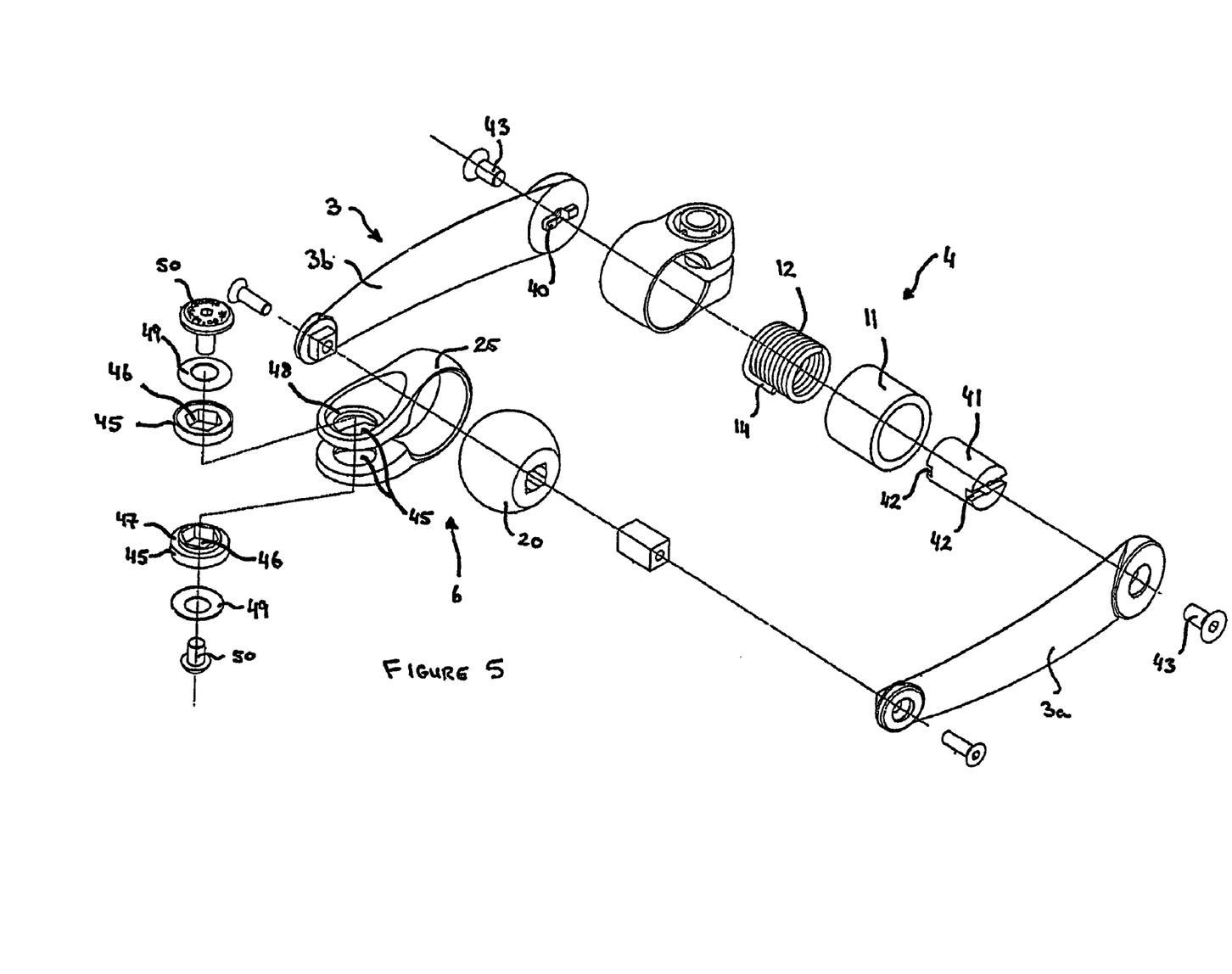
FIG. 5 shows a partial exploded perspective view of a modified embodiment of a monitor support arm according to the invention.
Figure 6:
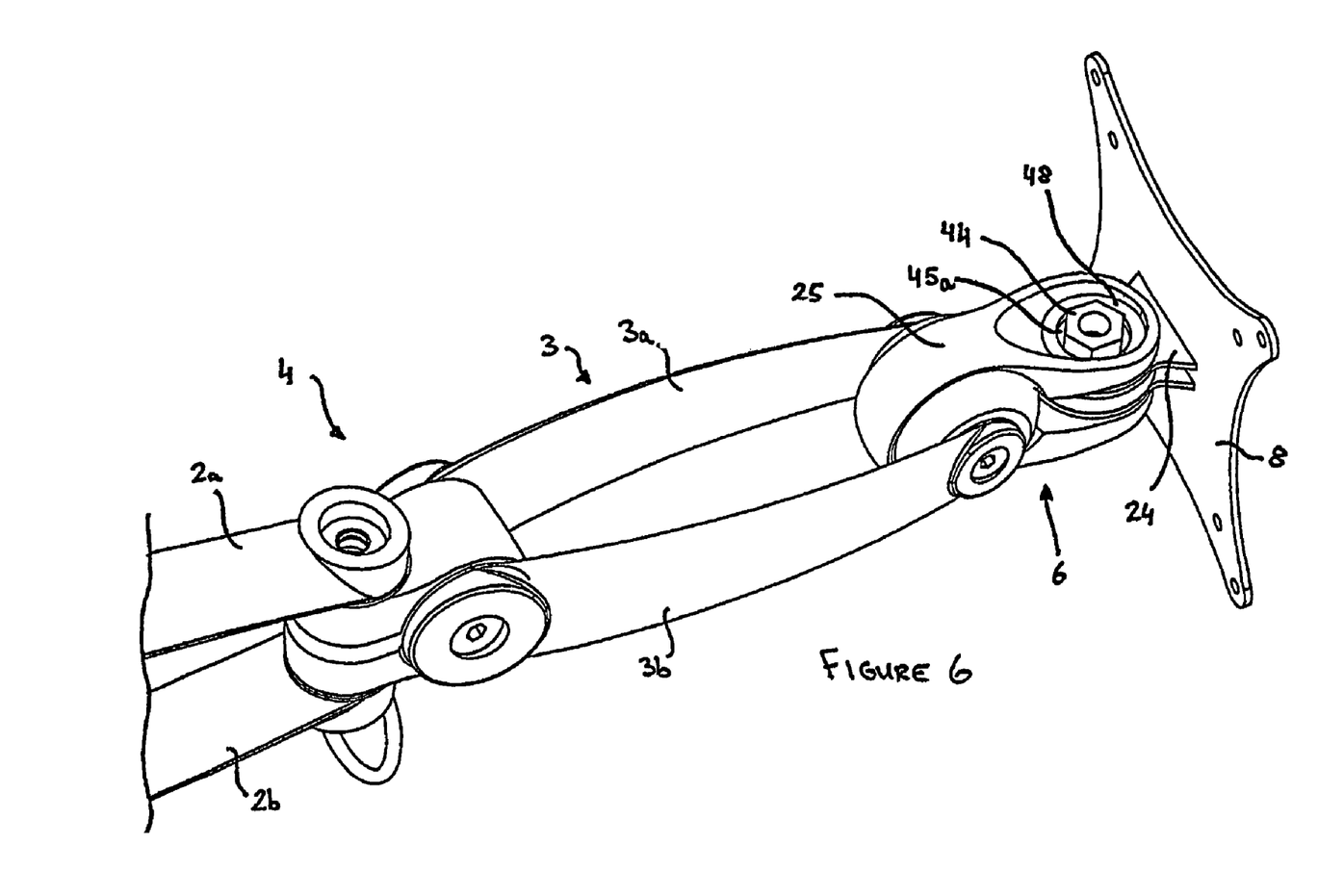
FIG. 6 shows a partial assembled perspective view of the modified embodiment of FIG. 5.

Referring now to FIGS. 5 and 6, there is shown a modified support arm according to a second embodiment of the invention. As with the first embodiment, the modified support arm has first and second support arms 2,3 each comprising a pair of parallel support legs 2a,2b,3a,3b connected by a pivot joint 4. The pivot joint 4 is identical to that of the first embodiment except that the boss 9 has been replaced by an elongate protruberance 40 on each of the support legs 3a,3b and the cylindrical inner hub member comprises a pin 41 having a radially extending slot 42 in either end thereof to receive the protruberance 40 when the support is assembled and a nut 43 is located through apertures in the support legs 3a,3b and the pin 41. The hooked portion 14 of the spring 12 now extends parallel to the axis of rotation and locates in a corresponding axially extending recess in the outer hub 11.

The universal joint 6 at the other end of the support legs 3a,3b has also been modified. As can be seen from FIG. 6, the head 24 of the support plate 8 now incorporates an integrally formed hexagonal boss 44 immovably mounted thereto so as to extend through a circular aperture 45a in the strap 25. Referring now to FIG. 5, the strap 25 includes a pair of rings 45 each having hexagonal openings 46 which locate over the hexagonal boss 44. Each ring 45 has a rim 47 that seats around the periphery 48 of the aperture 45 in the strap 25. A flat spring washer 49 is located over each ring 45 and a nut 50 fastens the assembly together which tightens against the hexagonal boss 44 on the head 24 of the support plate 8. The support plate 8 is therefore held fixed due to the friction between the rings 45 and the periphery 48 of the aperture 45 and this friction must be overcome when the support plate 8 is moved relative to the strap 25. This arrangement is an improvement because the friction between the rings 45 and the periphery 48 of the aperture 45 is generally constant and the ability to move the support plate 8 is less dependent on the tightness of the nut 50.

It will be apparent that the present invention provides a pivot joint between two arms that makes it much easier to position a monitor attached to the end of the arms. It also provides a flexible and easy to manufacture and assemble joint that enables the monitor to have a very wide range of movement.

Many modifications and variations of the invention falling within the terms of the appended claims will be apparent to a person skilled in the art and the foregoing description should be regarded as a description of a preferred embodiment only.

The invention claimed is:

1. A support for an electrical display device including a pair of support members connected by a universal joint comprising a part spherical bearing mounted on one support member such that the universal joint cannot move relative to said support member, the part spherical bearing being received within a bearing seat pivotally mounted to the other support member to enable relative movement between the bearing and the bearing seat in any direction and, between the bearing seat and the other support member about a pivot axis, wherein the bearing seat comprises a looped element having opposite ends and an arcuate bearing surface extending therebetween, wherein said looped element loops around the part-spherical bearing with said arcuate bearing surface in sliding contact with the part-spherical bearing such that said looped element and part-spherical bearing can move relative to each other in any direction, said opposite ends of the looped element being attached to said other support member to close the looped element around the part-spherical bearing and so that the arcuate bearing surface exerts a compressive force against the part spherical bearing, said opposite ends of the looped element also being attached to said other support member so as to enable rotation of said other support member and the looped element relative to each other about the pivot axis.

2. A support for an electrical display device according to claim 1, comprising corresponding apertures formed in the ends of the looped element and the other support member to receive a fastening member to pivotally attach the looped element to the other support member so that a compressive force is exerted by the looped element on the bearing.

3. A support for an electrical display device according to claim 2, wherein a resilient material layer is disposed between at least one end of the looped element and the other support member to enable the compressive force exerted on the bearing to be adjusted by tightening or loosening the fastening member.

4. A support for an electrical display device according to claim 1, wherein said one support member is a support arm and said other support member is a support plate to receive and mount a display device.

5. A support for an electrical display device according to claim 4, wherein the bearing is immovably mounted to the support plate and the bearing seat is pivotally mounted to the support arm to enable rotation of the bearing seat about the pivot axis.

6. A support for an electrical display device according to claim 5, wherein the support plate includes a mounting surface for the display device and a socket to receive and immovably mount the bearing.

7. A support for an electrical display device according to claim 5, wherein the bearing and support plate are integrally formed.

8. A support for an electrical display device according to claim 4, wherein the bearing is immovably mounted to the support arm and the bearing seat is pivotally mounted to the support plate.

9. A support for an electrical display device according to claim 8, wherein the support arm comprises a pair of parallel support legs, the legs being spaced from each other by the bearing.

10. A support for an electrical display device according to claim 8, wherein the support plate includes a mounting surface for the display device and a head portion to pivotally mount the bearing seat thereto for rotation about the pivot axis.

* * * * *